US006571151B1

(12) United States Patent
Leatherman

(10) Patent No.: US 6,571,151 B1
(45) Date of Patent: May 27, 2003

(54) WIRELESS NOZZLE INTERFACE FOR A FUEL DISPENSER

(76) Inventor: Russel Dean Leatherman, 6106 Four Oaks Ct., Summerfield, NC (US) 27358

(*) Notice: Subject to any disclaimer, the term of this patent is extended or adjusted under 35 U.S.C. 154(b) by 0 days.

(21) Appl. No.: 09/036,112

(22) Filed: Mar. 6, 1998

(51) Int. Cl.$^7$ .................................................. G05D 7/00
(52) U.S. Cl. ........................... 700/282; 141/94; 340/5.9
(58) Field of Search ................................ 700/283, 282, 700/236, 231; 705/413; 141/392, 94; 340/5.9

(56) References Cited

U.S. PATENT DOCUMENTS

| | | | | | |
|---|---|---|---|---|---|
| 3,322,350 | A | * | 5/1967 | Heinicke et al. | 239/172 |
| 4,005,412 | A | | 1/1977 | Leander | 340/815.42 |
| 4,140,013 | A | | 2/1979 | Hunger | 73/861.77 |
| 4,469,149 | A | * | 9/1984 | Walkey et al. | 141/94 |
| 4,934,419 | A | * | 6/1990 | Lamont et al. | 141/94 |
| 4,934,565 | A | * | 6/1990 | Heisey et al. | 222/22 |
| 5,156,198 | A | | 10/1992 | Hall | 141/94 |
| 5,184,309 | A | | 2/1993 | Simpson et al. | 700/283 |
| 5,204,819 | A | * | 4/1993 | Ryan | 705/413 |
| 5,249,612 | A | * | 10/1993 | Parks et al. | 141/219 |
| 5,249,707 | A | | 10/1993 | Simpson et al. | 222/40 |
| 5,266,925 | A | | 11/1993 | Vercellotti et al. | 340/505 |
| 5,267,592 | A | | 12/1993 | Kaplan et al. | 141/387 |
| 5,300,875 | A | | 4/1994 | Tuttle | 320/138 |
| 5,302,239 | A | | 4/1994 | Roe et al. | 216/11 |
| 5,323,150 | A | | 6/1994 | Tuttle | 257/793 |
| 5,330,073 | A | * | 7/1994 | Collins et al. | 222/52 |
| 5,359,522 | A | * | 10/1994 | Ryan | 705/413 |
| 5,365,551 | A | | 11/1994 | Snodgrass et al. | 375/141 |
| 5,365,984 | A | | 11/1994 | Simpson et al. | 141/387 |
| 5,381,962 | A | * | 1/1995 | Teague | 239/526 |
| 5,448,110 | A | | 9/1995 | Tuttle et al. | 257/723 |
| 5,458,170 | A | | 10/1995 | Ferguson | 141/392 |
| 5,479,416 | A | | 12/1995 | Snodgrass et al. | 714/785 |
| 5,497,140 | A | | 3/1996 | Tuttle | 340/42 |
| 5,500,650 | A | | 3/1996 | Snodgrass et al. | 342/42 |
| 5,505,234 | A | | 4/1996 | Simpson et al. | 141/206 |
| 5,507,325 | A | * | 4/1996 | Finlayson | 141/83 |
| 5,535,130 | A | * | 7/1996 | Long | 700/231 |
| 5,539,775 | A | | 7/1996 | Tuttle et al. | 375/145 |
| 5,552,743 | A | | 9/1996 | Manning | 327/567 |
| 5,557,780 | A | | 9/1996 | Edwards et al. | 395/500.48 |
| 5,558,679 | A | | 9/1996 | Tuttle | 29/623.1 |
| 5,572,226 | A | | 11/1996 | Tuttle | 343/726 |
| 5,583,850 | A | | 12/1996 | Snadgrass et al. | 370/342 |
| 5,604,681 | A | | 2/1997 | Koeninger | 700/285 |
| 5,605,182 | A | | 2/1997 | Oberrecht et al. | 141/94 |
| 5,608,739 | A | | 3/1997 | Snodgrass et al. | 714/785 |
| 5,621,913 | A | | 4/1997 | Tuttle et al. | 455/90 |
| 5,654,497 | A | | 8/1997 | Hoffheins et al. | 73/23.2 |
| 5,717,374 | A | * | 2/1998 | Smith | 340/438 |
| 5,722,469 | A | * | 3/1998 | Tuminaro | 141/83 |
| 5,890,520 | A | * | 4/1999 | Johnson, Jr. | 700/231 |
| 5,913,180 | A | * | 6/1999 | Ryan | 702/45 |
| 5,921,263 | A | * | 7/1999 | Negley, III | 137/3 |
| 5,923,572 | A | * | 7/1999 | Pollock | 700/282 |
| 5,944,069 | A | * | 8/1999 | Nusbaumer et al. | 141/94 |
| 5,956,254 | A | * | 9/1999 | Collins | 700/239 |
| 5,956,259 | A | * | 9/1999 | Hartsell, Jr. et al. | 700/302 |
| 6,024,142 | A | * | 2/2000 | Bates | 141/94 |
| 6,116,298 | A | * | 9/2000 | Haimovich et al. | 141/94 |

FOREIGN PATENT DOCUMENTS

| | | |
|---|---|---|
| DE | 3438939 C1 | 5/1986 |
| EP | 0 298 464 | 1/1989 |
| EP | 0 653 376 A1 | 5/1995 |
| EP | 0736 484 A2 | 10/1996 |
| WO | WO 97/35284 | 9/1997 |

* cited by examiner

*Primary Examiner*—Ramesh Patel
*Assistant Examiner*—Edward F. Gain, Jr.

(57) ABSTRACT

The present invention provides an intelligent nozzle having a communication system capable of wireless, remote communications with an associated dispenser. Information may be transmitted from the dispenser to the nozzle to facilitate nozzle control or display to a customer, and information received at the nozzle may be transmitted to the dispenser for further processing or display.

45 Claims, 10 Drawing Sheets

WIRELESS NOZZLE INTERFACE FOR A FUEL DISPENSER

BACKGROUND OF THE INVENTION

The present invention relates to a wireless nozzle interface for a fuel dispenser and an intelligent nozzle associated therewith, and, more particularly, to an improved dispenser and nozzle providing RF communications between an intelligent nozzle and a fuel dispenser to enhance nozzle functionality in an intrinsically safe manner.

Historically, designers of fuel dispensers and nozzles have attempted to provide electronics, displays, and basic controller functions within the nozzle itself. These attempts have been unacceptable given the difficulty of transporting electrical power and signals from the fuel dispenser to the nozzle in a safe manner. U.S. Pat. No. 4,005,412, issued on Jun. 25, 1977 to Leandr is exemplary of the prior art. Leandr discloses a display placed on a fuel dispenser's nozzle. The display is capable of displaying the amount of fuel dispensed, or other desired information. The nozzle is completely powered by a battery installed therein. Another example of such a nozzle is described in U.S. Pat. No. 4,140,013 to Hunger. The Hunger reference discloses a nozzle having an electronic flow meter and a display system for displaying data to a customer. The reference suggests using a battery for powering the electronic flow meter and display.

Numerous other attempts have been made in the prior art to provide electronics and computer-type capabilities at the dispensing nozzle. The problem in the prior art is that no safe and energy efficient way exists to provide power and communications to the nozzle. Because of the high volatility of fuel being dispensed, it has always been unsafe to provide direct power supplies in the nozzle, or to run electrical wires to the nozzle. As a result, although numerous patents and prior art publications showing electronics installed in fuel dispensing nozzles exist, none of these have met with commercial success. Regulatory bodies responsible for safety, such as Underwriters Laboratories (UL), have been reluctant to grant approval to fuel dispensing nozzles with unsafe power supplies built in.

Another problem with powering and communicating with fuel dispensing nozzles is that wires must run from the remote location, down the fuel dispensing hose, to the nozzle. The problem with this is that the nozzle is often twisted and turned by the user relative to the fuel dispensing hose. Such use presents the danger that the wires will bend too often and eventually fray or electrically short to one another. Due to the volatility of the fuel being dispensed, the situation can become dangerous and explosions may occur.

U.S. Pat. Nos. 5,184,309 and 5,365,984 to Simpson et al. disclose an intelligent dispensing nozzle and an electrical connector and fuel dispenser hose for providing an electronic connection between the dispenser and the intelligent nozzle, respectively. The first Simpson et al. reference discloses a rechargeable battery and one of two power supply means. The first power supply means facilitates an electromagnetic coupling of the nozzle to the fuel dispenser, when the nozzle is placed in the dispenser. With the electromagnetic coupling, the fuel dispenser is unable to communicate with the nozzle during a fueling operation. All information must be gathered and sent to the dispenser after the fueling operation is ended and the nozzle is placed back on the dispenser.

The second embodiment uses an electrical-to-optical power conversion and requires an expensive, complex fuel delivery hose having an optical link between the dispenser and nozzle. The electrical-to-optical conversion provides limited power and requires complex mechanical configurations to maintain connection between the nozzle and delivery hose and the dispenser and delivery hose, especially since the nozzle is preferably designed to spin relative to the delivery hose.

The second Simpson et al. reference discloses a connector for an electrical connection between the dispenser nozzle and the delivery hose. The electrical connector and dispensing hose disclosed are very complex and expensive to manufacture, in addition to being incompatible with all nozzles other than a specific nozzle design to interface with such hose and connector. Both of the Simpson et al patents are incorporated herein by reference.

Given the desire to provide user-friendly electronics, data input capabilities and other components, which require electric power, in a fuel dispensing nozzle, it can be appreciated from the above discussion that there is a need to provide a safe, efficient and easy-to-manufacture technique for providing communications between a fuel dispenser and the dispensing nozzle.

SUMMARY OF THE INVENTION

The present invention provides an intelligent nozzle having a communication system capable of secure wireless communications with an associated dispenser. Information may be transmitted from the dispenser to the nozzle to facilitate nozzle control or display to a customer, and information received at the nozzle may be transmitted to the dispenser for further processing or display.

Accordingly, one aspect of the present invention is to provide an intelligent nozzle for a fuel dispenser comprising a body having a fuel inlet for receiving fuel, a spout for delivering fuel, a flow path between the inlet and spout, and a handle portion with a trigger for controlling the fuel delivery along the flow path. The nozzle may include a control system for processing information and wireless communication electronics operatively associated with the control system and adapted to provide wireless communications between the nozzle and a dispenser communication device at an associated dispenser. The control system and communications electronics operate to provide an intrinsically safe wireless communication link between the nozzle and the dispenser communication device.

The nozzle may include a power supply with or without a battery, recharging circuitry and optional energy coupling electronics to aid in recharging the battery. Energy may be electromagnetically coupled to the nozzle from a transformer located at or near the fuel dispenser. Preferably, such recharging using the electromagnetically-coupled energy occurs when the nozzle is mounted in the dispenser.

The nozzle may also include a display mounted on the body and coupled to the control system to display information to a customer. An input device may be provided on the body and coupled to the control system to allow a customer to input information to the control system. The input device may be a keypad and/or card reader.

The nozzle trigger may be operatively coupled to a trigger position detector adapted to provide a trigger position signal indicative of trigger position. The control system will receive the trigger position signal and provide a flow control signal based thereon. The flow signal may be used to derive a flow control signal configured to operate a flow control valve. Optionally, the flow control signal and any other information may be transmitted to the fuel dispenser for additional flow control. Thus, information gathered at the nozzle or received by the customer at the nozzle may be used at the nozzle and/or transmitted to the fuel dispenser for processing. Information gathered or received at the fuel dispenser may be transmitted to the nozzle for processing at the nozzle or displayed to the customer at the nozzle.

Additionally, the nozzle may include various sensors, such as octane sensors in the fuel delivery path or hydrocarbon concentration sensors in the vapor recovery path to provide signals to control fuel delivery and vapor recovery, respectively. The control may take place at the nozzle and/or the dispenser after transmission.

Communications are preferably radio communications in the microwave range, but may include radio communications or any other type of wireless communication means to facilitate information transfer. Preferably, the information is transmitted through free air between the dispenser and nozzle, but may be transmitted wirelessly within the fuel delivery hose wherein the hose acts as a wave guide channeling signals back and forth between the nozzle and dispenser.

Another aspect of the present invention provides a fuel dispenser for communicating with a remote intelligent nozzle at the end of a delivery hose. The dispenser includes a housing, fuel delivery system at the housing having a fuel supply line, metering device and an outlet. The dispenser also includes dispenser communications electronics and a control system. The nozzle includes a fuel inlet for receiving fuel, a spout for delivering fuel, a flow path between the inlet and spout, and a handle portion with a trigger for controlling the fuel delivery along the fuel flow path. A nozzle control system is used to process information at the nozzle and is associated with wireless dispenser communication electronics operatively associated with the control system and adapted to provide wireless communications between the nozzle and the dispenser communications electronics. The control system and communications electronics of the nozzle operate to provide an intrinsically safe wireless communication link between the nozzle communications electronics and the dispenser communications electronics.

Yet another aspect of the present invention provides a method of using an intelligent nozzle with a fuel dispenser to provide wireless communications therebetween. The method includes the steps of providing a nozzle having first communications electronics, providing a fuel dispenser having second communications electronics adapted to communicate with the first electronics, transmitting information to the nozzle from the fuel dispenser, and controlling the nozzle based on the information transmitted. The method may also include displaying the information on a nozzle display, controlling the nozzle based on the information, and transmitting additional information from the nozzle to the fuel dispenser. Likewise, information may be transmitted from the nozzle to the fuel dispenser wherein the dispenser is controlled based upon this information. The information may be generated at the nozzle or provided by the customer.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
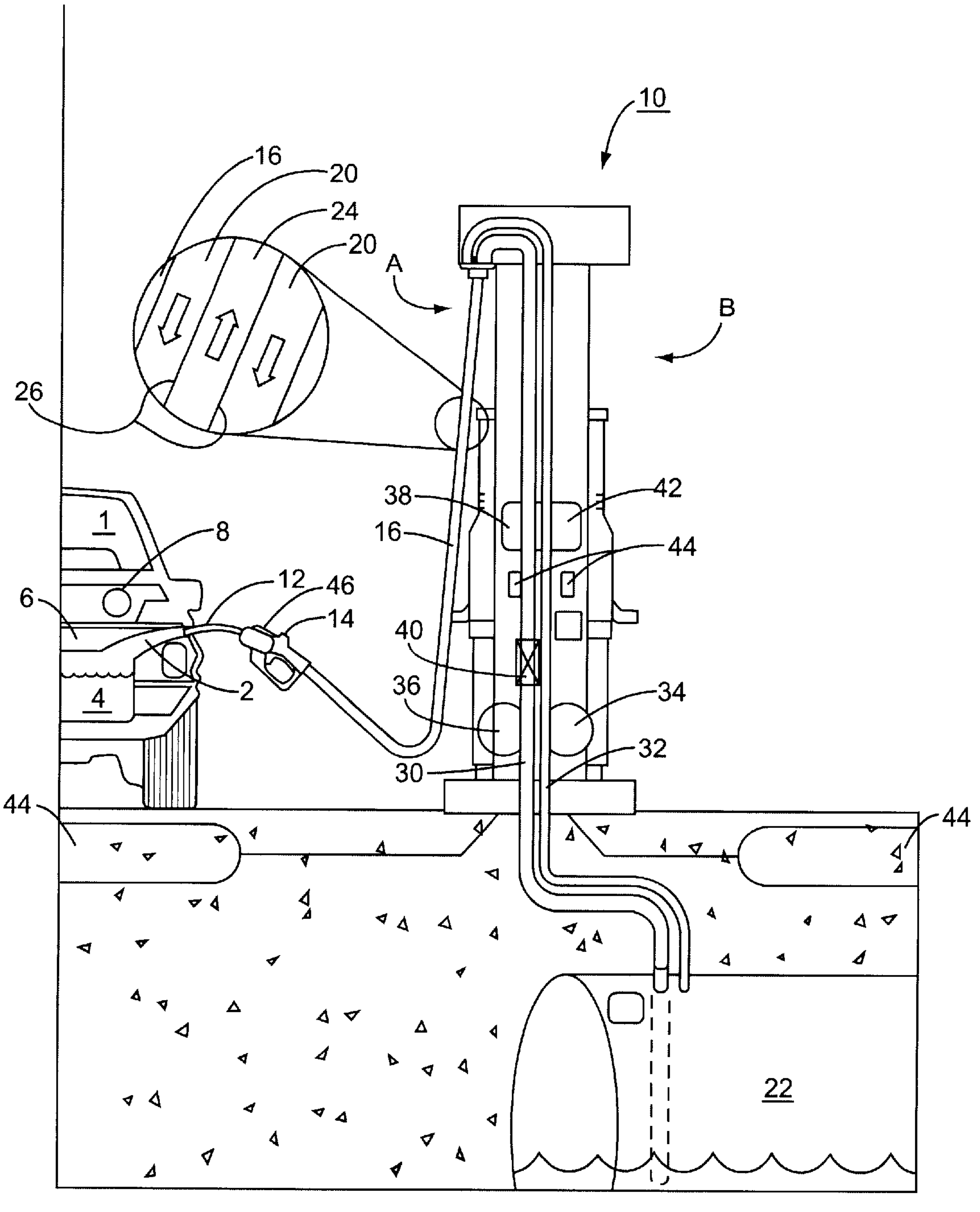
FIG. 1 is a schematic sectional view of a typical fuel dispenser constructed according to the present invention.

Referring now to the drawings in general, and FIG. 1 in particular, it will be understood that the illustrations are for the purpose of describing a preferred embodiment of the invention and are not intended to limit the invention thereto. As best seen in FIG. 1, in a typical service station, a vehicle 1 is shown being fueled from a gasoline dispenser 10. A spout 12 of nozzle 14 is shown inserted into a filler pipe 2 of a fuel tank 4 during the refueling of the vehicle 1.

A fuel delivery hose 16 having vapor recovery capability is connected at one end to the nozzle 14, and at its other end to the fuel dispenser 10. As shown by the enlarged cutaway view of the interior of the fuel delivery hose 16, an annular fuel delivery passageway 20 is formed within the fuel delivery hose 16 for distributing gasoline pumped from an underground storage tank 22 to the nozzle 14. Also within the fuel delivery hose 16 is a tubular vapor recovery passageway 24 for transferring fuel vapors expelled from the vehicle's fuel tank 4 to the underground storage tank 22 during the fueling of a vehicle. The fuel delivery hose 16 is depicted as having an internal vapor recovery hose 26 for creating the vapor recovery passage from the spout 12 to the underground storage tank 22. Inside the dispenser 10, fuel is carried to hose 16 by piping 30, and vapor is returned through recovery hose 32.

A vapor recovery pump 34 provides a vacuum in the vapor recovery passage for removing fuel vapor during a refueling operation. The vapor recovery pump 34 may be placed anywhere along the vapor recovery passage between the nozzle 14 and the underground fuel storage tank 22. The vapor recovery system using the pump 34 may be any suitable system, such as those shown in U.S. Pat. No. 5,040,577 to Pope, U.S. Pat. No. 5,195,564 to Spalding, U.S. Pat. No. 5,333,655 to Bergamini et al., or U.S. Pat. No. 3,016,928 to Brandt. Various ones of these systems are now in commercial use recovering vapor during refueling of conventional non-ORVR vehicles. The present invention addresses an adaptation of those systems for use with ORVR vehicles.

The dispenser 10 also includes a fuel delivery pump 36 for effecting delivery of fuel to the vehicle, a flow meter 38 providing volumetric measures of fuel delivery, and a control valve 40 for selectively and preferably variably controlling fuel flow. The control valve 40 is preferably an electronically controlled flow valve adapted to continuously vary flow rate. A dispenser control and communications system 42 having antennas 44 is adapted to provide control of the fuel dispenser and communications to a nozzle control and communications system 46 located within the nozzle 14.

Figure 2:
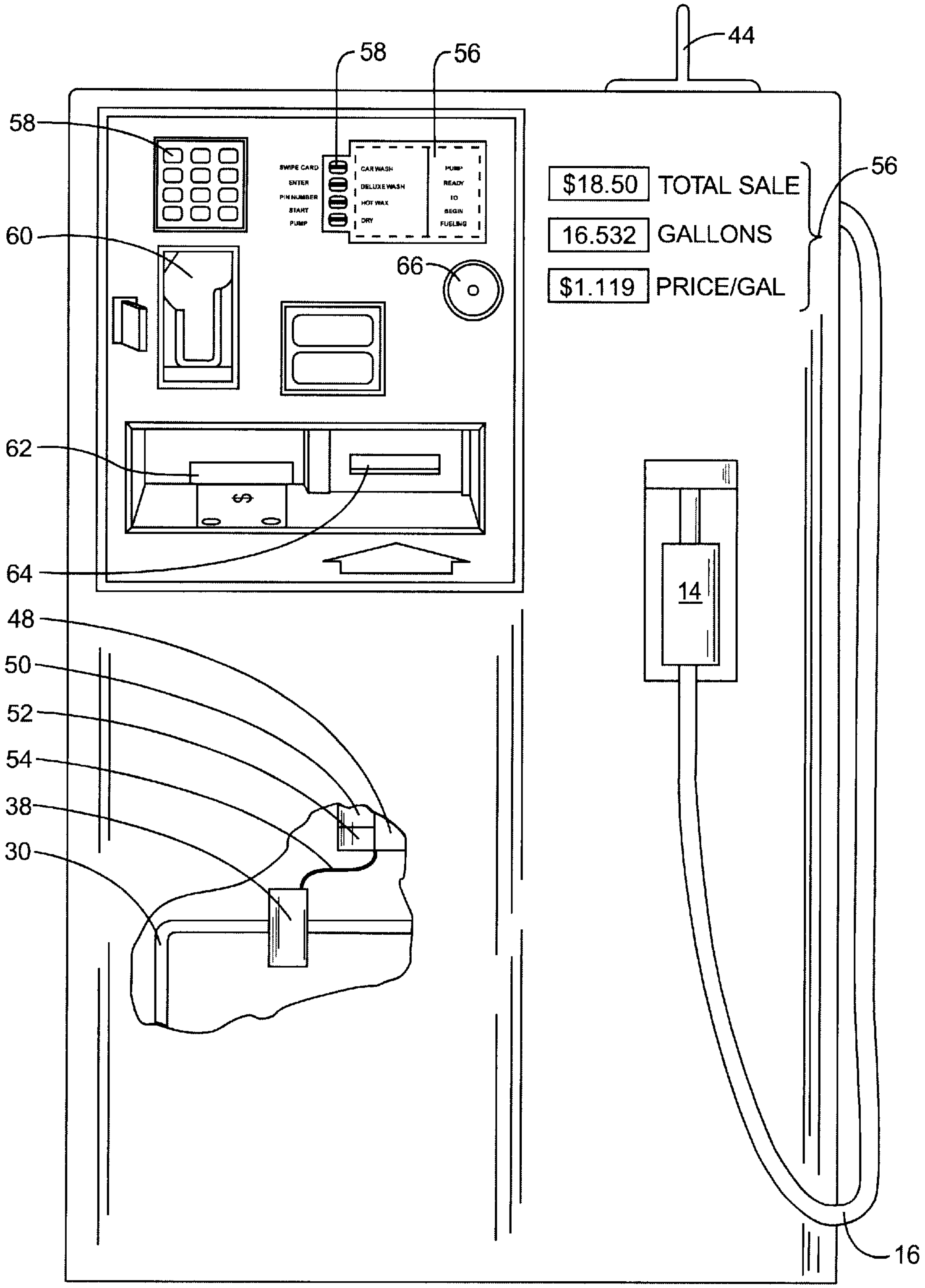
FIG. 2 is a front view of a fuel dispenser, with a portion broken away, constructed according to the present invention.

Turning now to FIG. 2, the front schematic view of the dispenser shows the dispenser control electronics 48, communications electronics 50, associated memory 52, control lines 54 and various dispenser components in addition to those shown in FIG. 1. These components include one or more dispenser displays 56 for providing anything from transactional information to advertising and other information. Dispenser keypads 58 are provided to receive customer information and inputs wherein the keypads 58 and displays 56 may provide a multimedia customer interface. The dispenser may also include a card reader 60 for receiving payment from credit, debit, smart and other transactional-type cards, as well as a cash acceptor 62 for receiving currency. A printer is provided to give the customer a hard copy of a receipt for the fuel and any other products ordered and/or paid for using the dispenser's customer interface. To complete the multimedia functionality of the dispenser, an audio system 66 is provided having a microphone and speaker for providing various types of audio information and entertainment, and receive audible requests, instructions or information from the customer.

Figure 3:
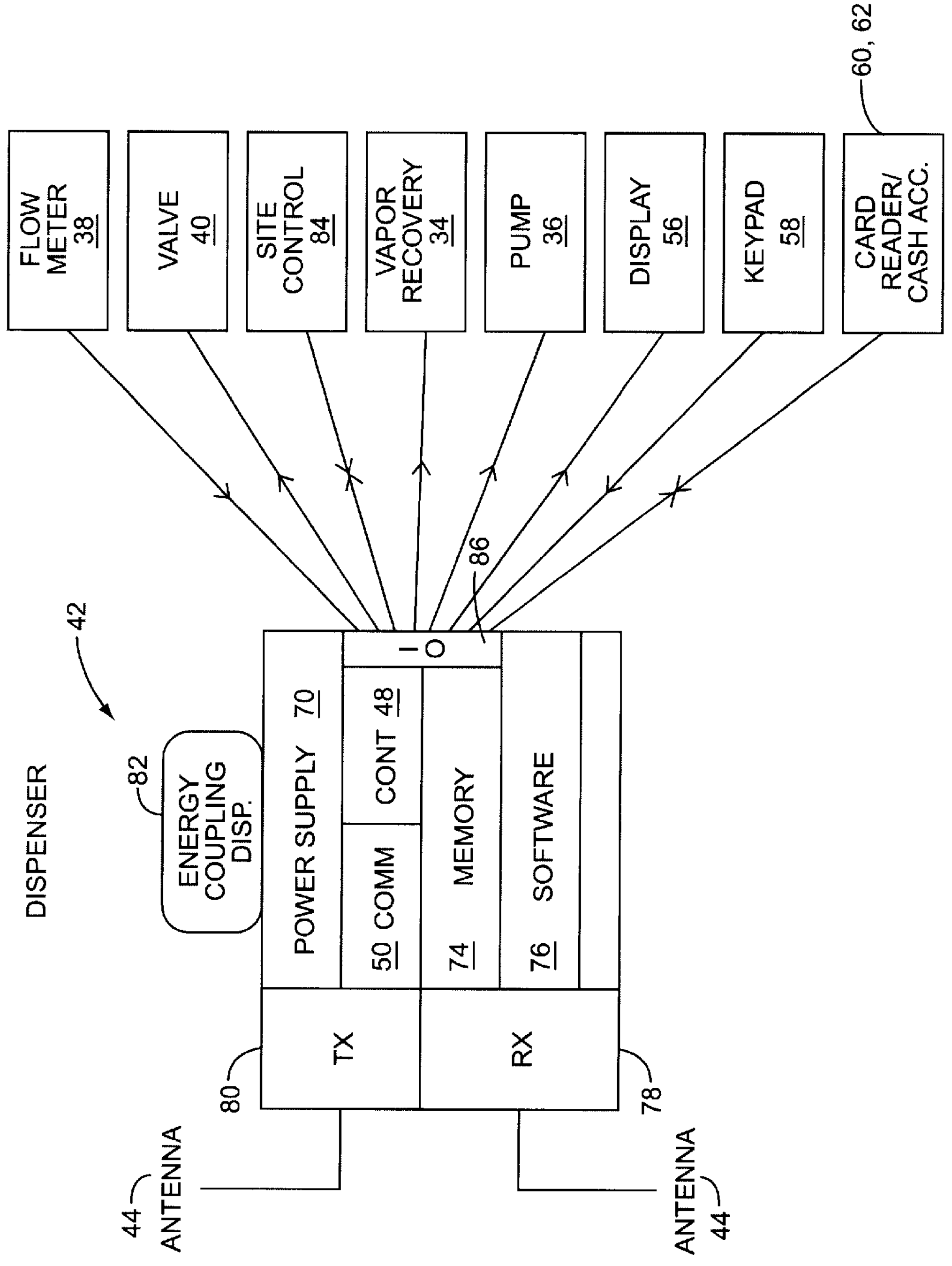
FIG. 3 is a schematic representation of the dispenser communication and control system electronics according to the present invention.

FIG. 3 provides a block diagram of the dispenser control and communications system, and some of the dispenser components with which the system interacts. The system will include a power supply 70, control electronics 48, and communications electronics 50 associated with or including memory 74 and the requisite software 76 to operate the system. The communications electronics 50 will include or be associated with a receiver 78 and transmitter 80 having one or more antennas to provide for radio communications to the nozzle control and communications system 46. The communications system may include switching circuitry and/or circulator circuitry to provide for transmission and reception from a single antenna or set of antennas.

The power supply 70 may also be associated with an energy coupling system 82 adapted to provide remote power to the nozzle, if necessary, in order to power the electronics or recharge batteries. The coupling may be a direct electrical connection or an electromagnetic or optical connection as disclosed in U.S. Pat. Nos. 5,184,308 and 5,365,984, both to Simpson et al., the disclosures of which have been incorporated herein by reference.

As shown in FIG. 3, the control system includes an input/output (I/O) port 86 for providing and receiving information, including both data and control information. The dispenser control system 42 may receive volumetric flow information from a flow meter 38, control the flow valves 40, and operate the delivery pump 36 as desired to start, stop and variably control the delivery of fuel from the underground storage tank 22 to the vehicle's tank 4. The control system may also operate to control the vapor recovery pump 34 or other vapor recovery components to recover vapors escaping the vehicle's fuel tank 4 during the fueling operation. Attention is drawn to U.S. application Ser. No. 08/649,455 filed May 17, 1996, entitled ONBOARD VAPOR RECOVERY DETECTION in the name of H. Craig Hartsell, Jr. et al., and U.S. application Ser. No. 08/759,733 filed Dec. 6, 1996, entitled INTELLIGENT FUELING in the name of H. Craig Hartsell, Jr. et al., the disclosures of which are incorporated herein by reference.

The dispenser control system 42 may also communicate with a site controller located apart from the fuel dispenser, and preferably in a fuel station store to provide overall, centralized control of the fuel station environment and the dispensers therein. A central-site controller 84, such as the G-Site controller sold by Gilbarco Inc., 7300 West Friendly Avenue, Greensboro, N.C., may also communicate with a remote network, such as a card verification authority, to ascertain whether a transaction to be charged to or debited from an account associated with the card inserted in the card reader 60 is authorized. The control system may also cooperate with the display 56 and keypad 58 to provide the graphical user interface discussed above as well as accept payment or payment information from the card reader 60 or cash acceptor 62. The dispenser control and communications system 42 is preferably comparable to the microprocessor-based control systems used in CRIND (card reader in dispenser) and TRIND (tag or transponder reader in dispenser) type units sold by Gilbarco Inc. under the trademark THE ADVANTAGE.

The communications and control electronics may be separate or integrated and are preferably configured as a control system associated with an interrogator providing the control electronics and the ability to communicate with the nozzle communications and control system 46. Any type of radio communications, unidirectional or bi-directional, depending on the configuration, is considered within the scope of the invention and the claims that follow this disclosure.

Figure 4A:
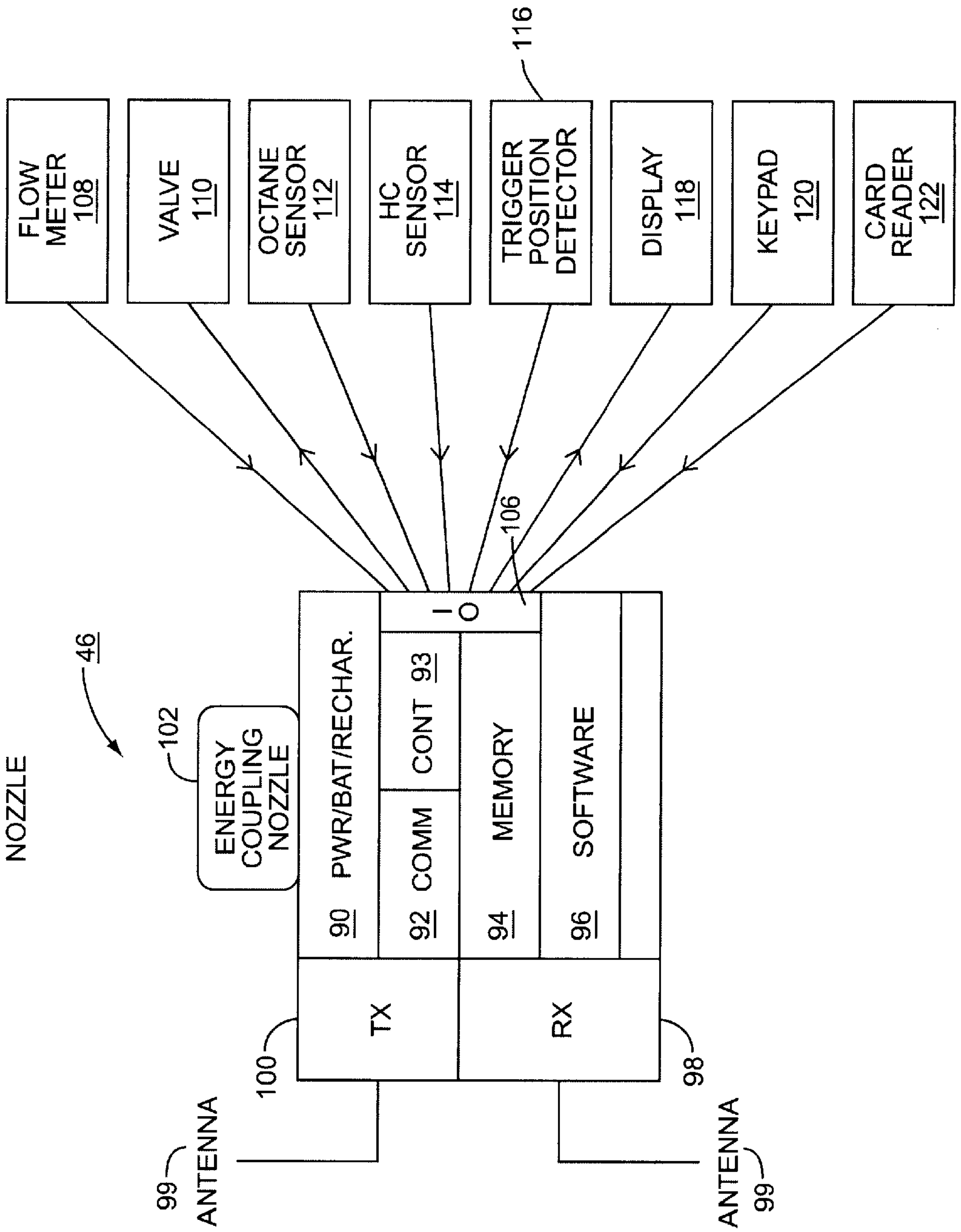
FIG. 4A is a schematic representation of the nozzle control and communication electronics according to the present invention.

With reference to FIG. 4A, a basic nozzle control and communications system 46 is shown. Like the dispenser's communications control system, the nozzle control and communications system will include a power supply 90, preferably including a battery and any necessary recharging circuitry, if desired. A controller 93 and communications electronics 92 cooperate in association with a memory 94 and any requisite software 96 to make the system operational. The communications electronics 92 include or are associated with a receiver 98 and transmitter 100, which are coupled to one or more antennas 99. Again, various antenna and communication circuitry may be employed to use one or more antennas to provide separate or integrated transmission and reception.

The nozzle communications and control system also includes an energy coupling mechanism 102 adapted to cooperate with the energy coupling mechanism 82 of the dispenser. The coupling may be direct electrical, electromagnetic, optical or any known system providing power to the nozzle or recharging circuitry. Notably, one embodiment of the invention does not require an energy coupling and operates on a replaceable battery, while another embodiment is configured to operate on energy received and stored from an interrogation pulse from the dispenser's communications electronics 50.

Figure 5:
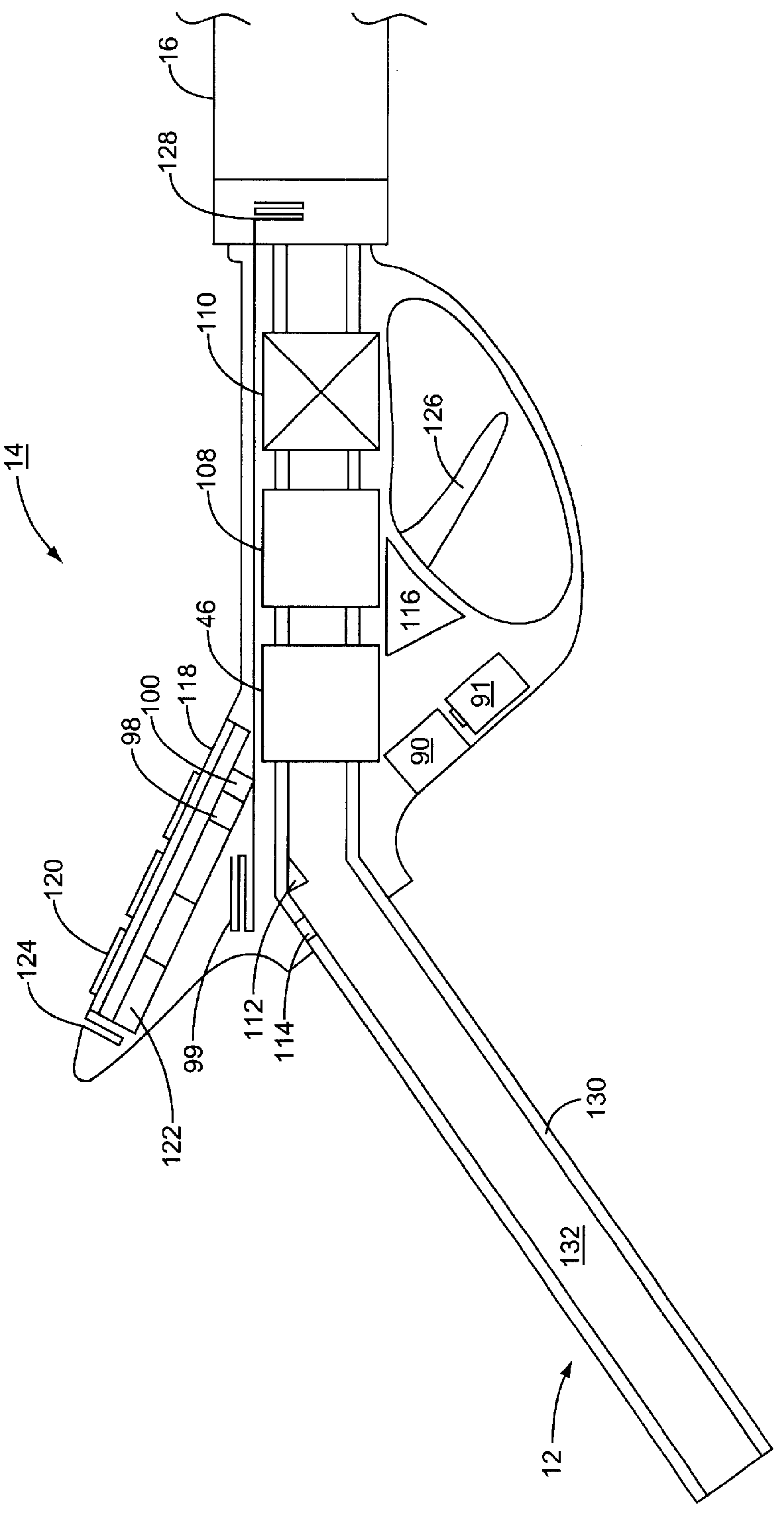
FIG. 5 is a cross-sectional schematic representation of a fuel dispensing nozzle constructed according to the present invention.
Figure 6:
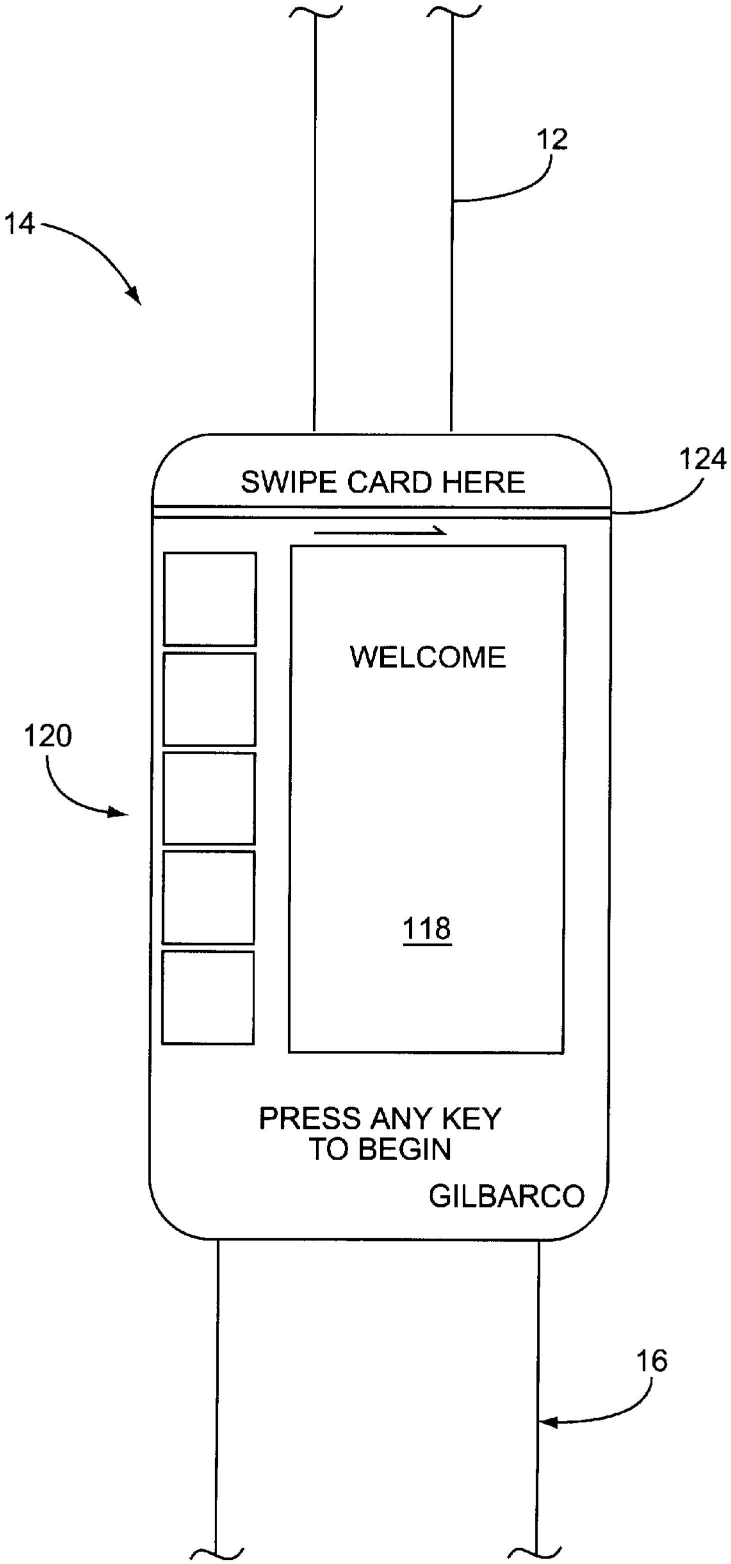
FIG. 6 is a schematic representation of the top of a fuel dispensing nozzle of FIG. 5.

The nozzle control and communications system 46 may also include an I/O port 106 communicating with the various nozzle components represented in FIGS. 4A, 5 and 6. The nozzle control system may receive volumetric flow data from a flow meter 108 or control delivery rates with a continuously variable electronic flow control valve 110. Control may be based on information received from the dispenser, predetermined algorithms stored in memory 94 or according to an output of a trigger position detector 116 based on the position of trigger 126. The output of the trigger position detector 116 may be used to control the nozzle's control valve 110 or be transmitted to the dispenser through the communications electronics 92 in order to control the fuel delivery system at the dispenser. Similarly, any flow related information from the flow meter 108, or other like devices, may be transmitted to the dispenser to control the dispenser's delivery and/or vapor recovery system.

The nozzle may also be configured with an octane sensor 112 located in the nozzle's fuel delivery path 132 in order to provide octane information to the nozzle controller 93 or transmit the information to the fuel dispenser, so the fuel dispenser can take appropriate action. Similarly, a hydrocarbon sensor 114 may be placed in the vapor return path 130 of the nozzle 14 to provide hydrocarbon concentration information for vapor recovery control. Typically, this information will be transmitted to the fuel dispenser to facilitate appropriate control of the vapor recovery pump 34, although the information may be used at the nozzle in certain embodiments. For additional information relating to transponder communications, attention is drawn to U.S. application Ser. No. 08/649,455 filed May 17, 1996, entitled ONBOARD VAPOR RECOVERY DETECTION in the name of H. Craig Hartsell, Jr. et al., and U.S. application Ser. No. 08/759,733 filed Dec. 6, 1996, entitled INTELLIGENT FUELING in the name of H. Craig Hartsell, Jr. et al. The disclosures of these applications are incorporated herein by reference. The control system may also drive a display 118 and receive customer input from a keypad 120 and/or a card reader 122 in order to provide a user interface at the nozzle. It should be noted that the broadest concept of the invention does not require implementation of a customer interface at the fuel dispenser nozzle.

The card reader 122 will typically include a slot 124 in the nozzle's body to facilitate swiping a card having a magnetic strip with information thereon. Many aspects of the present invention will use the wireless, radio communication interface for various types of communications to and/or from an associated fuel dispenser.

Figure 4B:
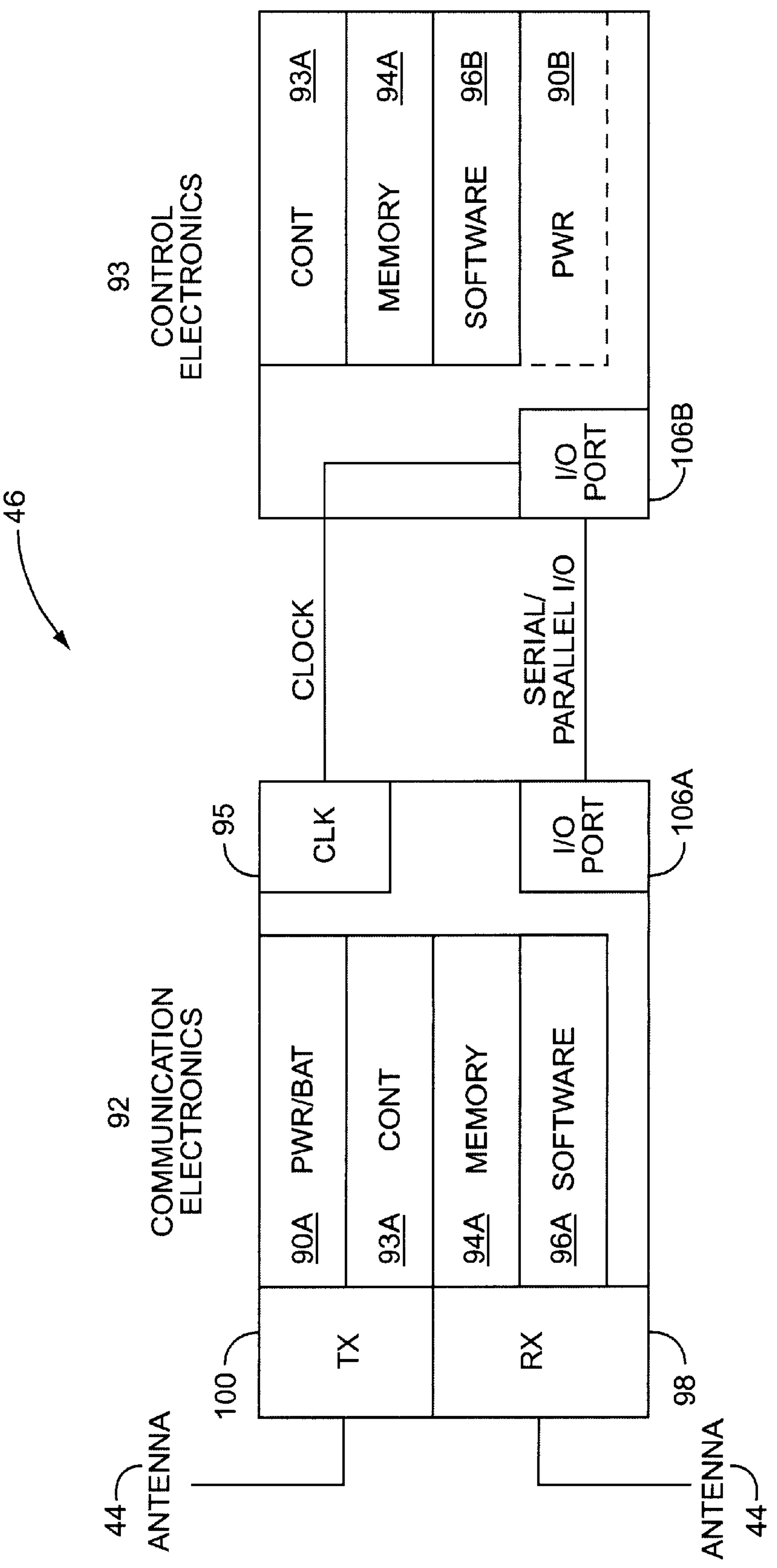
FIG. 4B is a schematic representation of an alternative embodiment of the nozzle control and communications electronics constructed according to the present invention.

In the preferred embodiment the dispenser's communication and control system 42 is adapted to provide unidirectional or bi-directional communications between an intelligent transponder making up the nozzle's communications electronics 92 and the dispenser. The transponder may be integrated into the nozzle's control and communications electronics, or may be separate, yet associated with the nozzle's control electronics as shown in FIG. 4B. For example, the communications electronics 92 may include a power supply 90A, a controller 93A, memory 94A, software 96A and the necessary transmitter and receiver 100, 98. The communications electronics 92 may include a clock 95 to synchronize communications between I/O port 106A of the communications electronics 92 and I/O port 106B of control electronics 93. The control electronics 93 of the embodiment of FIG. 4B may also contain a controller 93A, memory 94B, software 96B and possibly a power supply 90B.

The embodiment of FIG. 4B may be similar to the transponder incorporating the Micron Microstamp™ produced by Micron Communications, Inc., 8000 South Federal Way, Boise, Id. 83707-0006. The Micron Microstamp™ engine is an integrated system implementing a communications platform referred to as the Microstamp™ standard on a single CMOS integrated circuit.

A detailed description of the Microstamp™ engine and the method of communication are provided in its data sheets in the Micron Microstamp™ Standard Programmer's Reference Manual provided by Micron Communications, Inc. These references and the information provided by Micron Communications on their web site at http:\\www.mncc.micron.com are incorporated herein by reference. If the Micron Microstamp™ engine is used, the control electronics 93 shown in FIG. 4B may also interface with additional control electronics configured to control the various nozzle devices, or such control may be provided by the control capabilities provided by the Micron Microstamp™. Regardless of the embodiment, communication and control functions may be separate or integrated, in addition to being provided on a single CMOS integrated circuit.

In the preferred embodiment, communications between the serial ports 106A and 106B are serial and synchronized using clock 95. The memory in any of the configurations may be random access memory (RAM) and/or read only memory (ROM), or a combination thereof. Preferably, the communications electronics incorporate a spread-spectrum processor associated with an 8-bit microcontroller. The nozzle transponder is preferably configured to receive direct sequence, spread-spectrum signals having a center frequency of 2.44175 GHz and adapted to transmit a differential phase shift key (DPSK) modulated back-scatter at 2.44175 GHz with a 596 KHz sub-carrier to the dispenser.

For the sake of conciseness and readability, the term "transponder" will be used herein to describe any type of remote communications unit capable of communicating with the communications electronics of the fueling environment. The remote communications device may include traditional receivers and transmitters, alone or in combination, as well as traditional transponder electronics adapted to modify an original signal to provide a transmit signal. The transponder may be used to provide either uni-directional or bi-directional communications with the fuel dispenser.

The dispenser's communications electronics, preferably an interrogator, are adapted to cooperate in a communicative manner. For additional information on transponder/interrogator systems providing for highly secured transactions between a transponder and a host authorization system through a dispenser, attention is drawn to application Ser. No. 08/895,417 filed Jul. 16, 1997, entitled CRYPTOGRAPHY SECURITY FOR REMOTE DISPENSER TRANSACTIONS in the name of Williams S. Johnson, Jr.; application Ser. No. 08/895,282 filed Jul. 16, 1997, entitled MEMORY AND PASSWORD ORGANIZATION FOR REMOTE DISPENSER TRANSACTIONS in the name of William S. Johnson, Jr.; and application Ser. No. 08/895,225 filed Jul. 16, 1997, entitled PROTOCOL FOR REMOTE DISPENSER TRANSACTIONS in the name of William S. Johnson, Jr. The disclosures of these applications are incorporated herein by reference.

Figure 7:
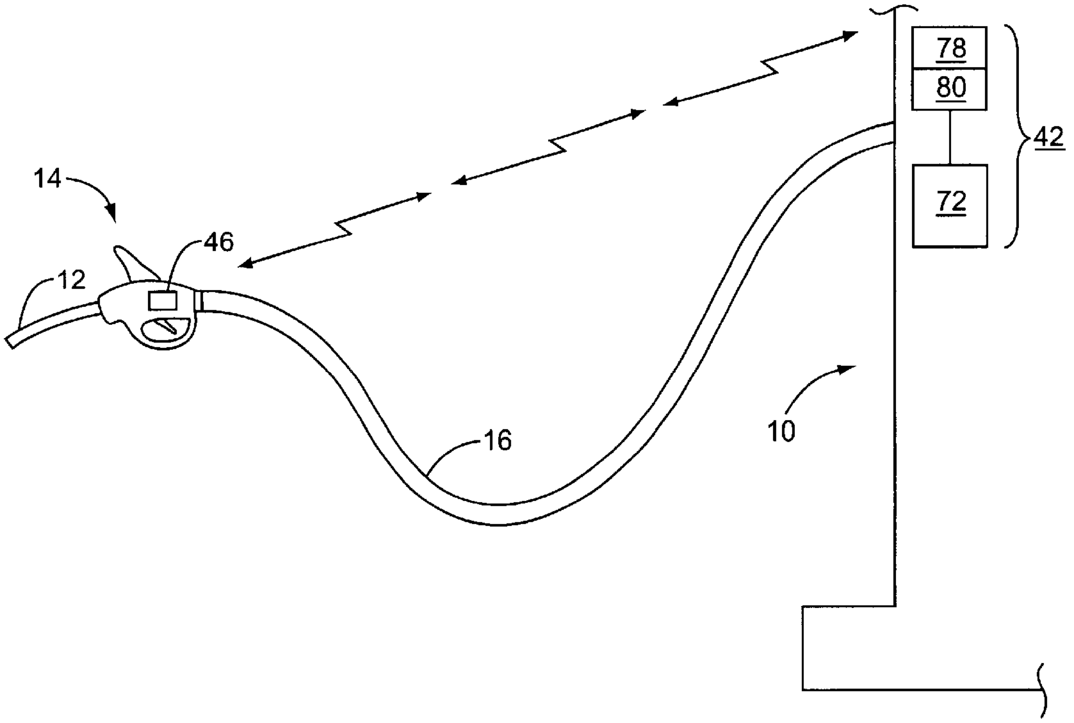
FIG. 7 is a schematic representation of a nozzle and dispenser system providing for free-air communications therebetween constructed according to the present invention.
Figure 8:
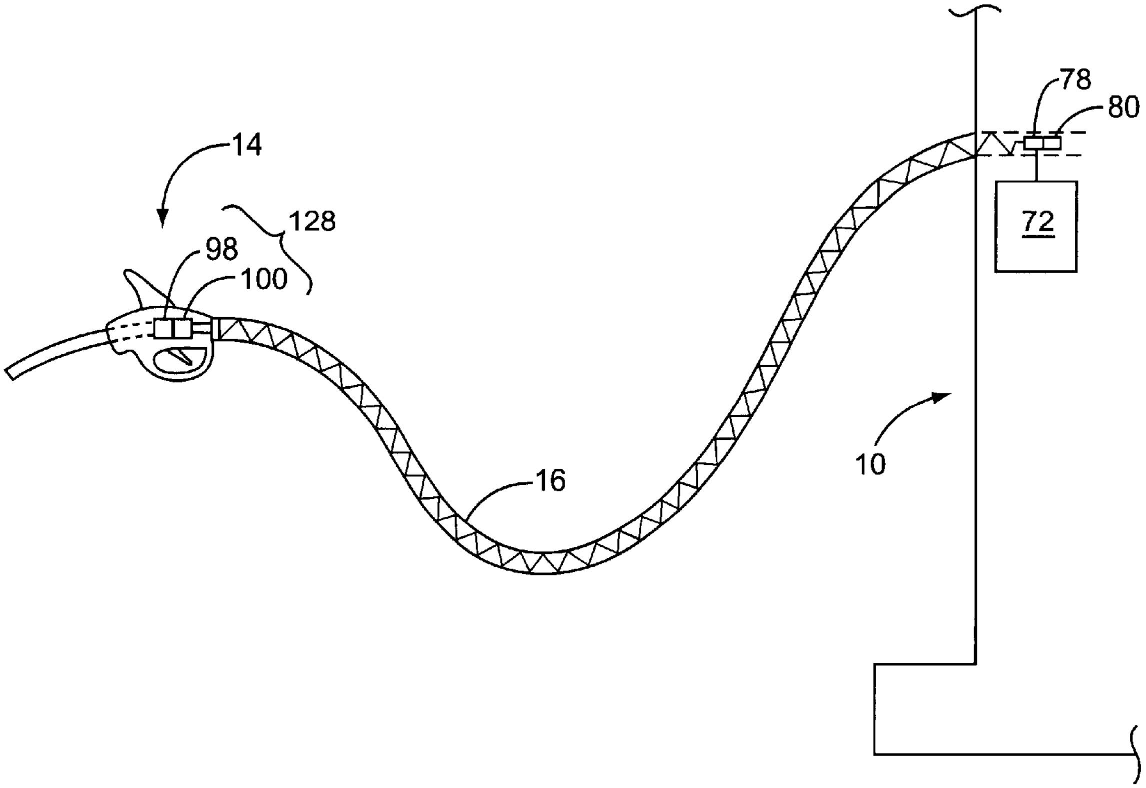
FIG. 8 is a schematic representation of a fuel dispensing nozzle and fuel dispenser providing for wireless communications using the delivery hose as a wave guide constructed according to the present invention.

Now turning to FIGS. 7 and 8, two methods of providing radio communications between the fuel dispenser and nozzle are shown. In FIG. 7, free air communications between the nozzle control and communication system 46 and the dispenser control and communication system 42 are provided. The signal is transmitted through free air, between the nozzle 14 and the dispenser 10. Preferably, the antennas associated with the respective communications systems are properly placed and/or duplicated to minimize the potential for interference with the transmitted signals.

In FIG. 8, radio communications between the dispenser 10 and nozzle 14 are provided using the fuel delivery hose 16 as a wave guide, wherein an internal wave antenna 128 is placed in the fuel delivery path 132 or vapor recovery path

130 of the nozzle, or within the delivery path 20 or vapor return path 24 in the fuel delivery hose 16 proximate to the nozzle 14. Notably, the typical recovery hose 16 is configured to deliver fuel in the annular, outer portion of the delivery hose while the dispenser nozzle delivers the fuel through the central cylindrical path 132. The nozzle incorporates the requisite hardware to provide such cross communication between the nozzle and delivery hose 16 with respect to both the fuel delivery and vapor recovery. In the latter wave-guide embodiment, the delivery hose 16 is preferably made of a steel mesh or other similar material providing wave guidance between an internal wave antenna 128 associated with transmitter and receiver 100, 98 at the nozzle 14 and antenna, transmitter and receiver 78, 80 of the fuel dispenser 10.

Figure 9:
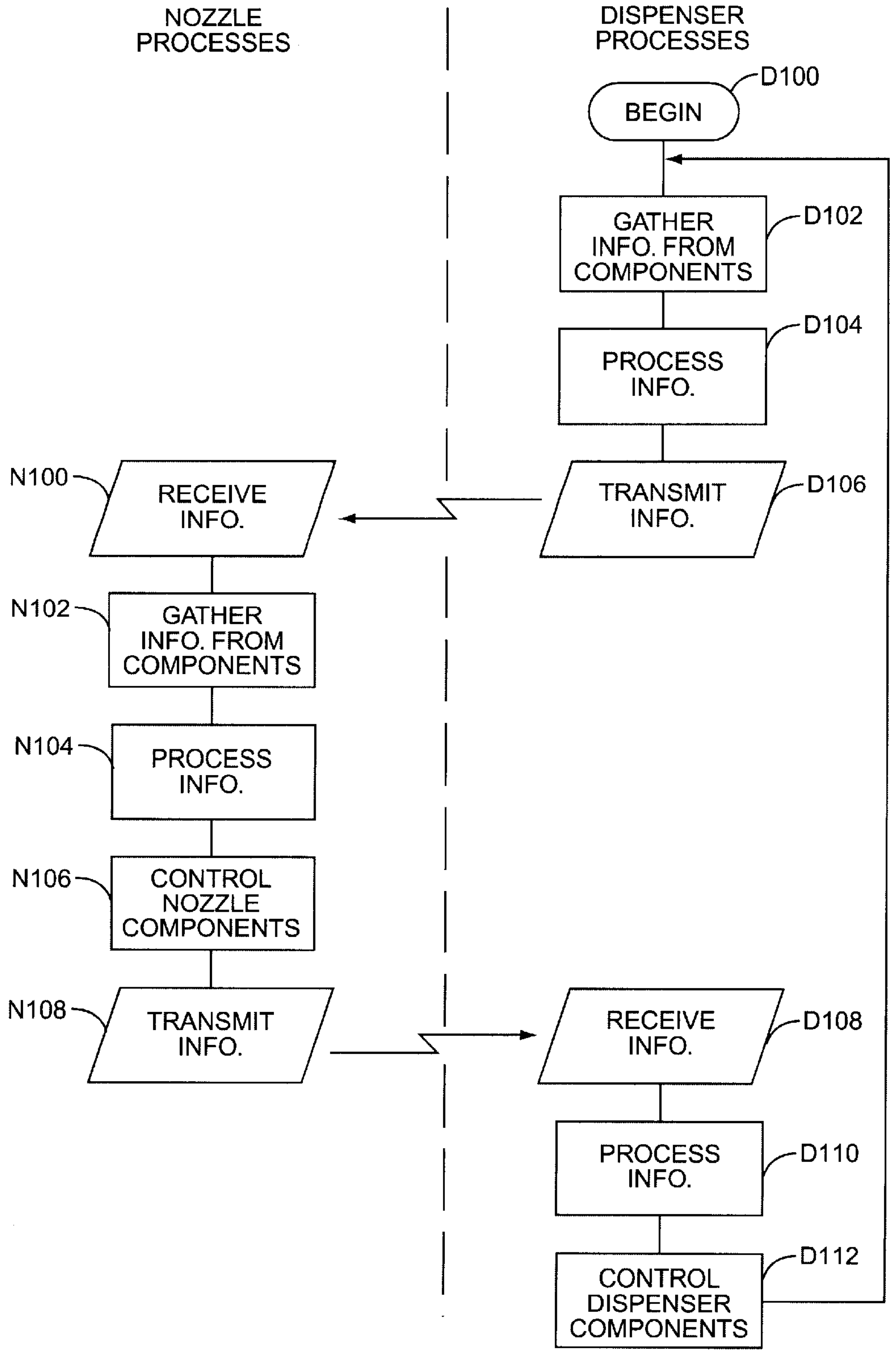
FIG. 9 is a flow chart representing the basic flow of the interaction of a dispensing nozzle with a fuel dispenser according to an embodiment of the present invention.

FIG. 9 depicts a basic process outlining communications between the intelligent nozzle and dispenser. In operation, the process begins (block D100) when the dispenser gathers information from any of the numerous dispenser components (block D102). The information is processed at the dispenser (block D104) and transmitted to the nozzle (block D106). The nozzle receives the information transmitted from the dispenser (block N100) and gathers information from the various nozzle components, if necessary, (block N102). The nozzle processes any information received from the transmitter or the nozzle components (block N104) and controls any of the various nozzle components as necessary (block N106). The nozzle may transmit certain information back to the dispenser (block N108). The dispenser receives the information transmitted from the nozzle (block D108), processes the information (block D110), and controls any dispenser components as necessary (block D112). At this point, the process will repeat, wherein the dispenser will gather information from the dispenser components (block D102), process information (block D104), and transmit the information to the nozzle (block D106).

Preferably, during operation the communication system of the dispenser will remain in secure and verifiable contact with the nozzle's communications and control system. In classic interrogation embodiments, the dispenser interrogator may interrogate the nozzle at a rate of twenty (20) contacts per second, for example, to provide such secure contact and rapid communication of information back and forth between the dispenser and nozzle, as necessary.

This system provides numerous benefits to the fueling operation. For example, readings from any of the dispenser components may be directly or indirectly transmitted to the nozzle for processing or display to the customer at the nozzle's display 118. In like fashion, any of the data read at the nozzle by any of the nozzle components, may be transmitted to the dispenser for processing and/or display at one of the dispenser's displays.

The information from either the nozzle or the dispenser may aid fuel delivery or vapor recovery control. For instance, readings from the nozzle trigger 126 and the trigger position detector 116 may be used to control fuel flow electronically at the fuel dispenser, by controlling the fuel delivery pump 36 and/or the control valve 40. The converse is equally capable. Additionally, metering data, octane ratings and hydrocarbon concentrations may be read at the nozzle and provided to the fuel dispenser for use. In short, any information obtainable at the dispenser may be provided to the nozzle, and vice versa, during a fueling operation to control nozzle components and affect the display of information to a customer. Any information obtained at or by the nozzle may be transmitted to the fuel dispenser for control or display purposes during a fueling operation. Such data transfer has previously been unavailable without complex, expensive and basically unacceptable direct electronic communication means.

The communications electronics at the nozzle may be configured or include additional transmitters or receivers to communicate with a transponder or like remote communications unit held by a customer or mounted on a vehicle. The nozzle's control system would, in effect, relay information received from the vehicle-mounted transponder to the dispenser through the nozzle's control and communications system 46. For the various applications provided by this feature, attention is drawn to provisional application Serial No. 60/060,066 filed Sep. 26, 1997, entitled COMPREHENSIVE INTELLIGENT FUELING in the name of Timothy E. Dickson et al., the disclosure of which is incorporated herein by reference.

Certain modifications and improvements will occur to those skilled in the art upon reading the foregoing description. It should be understood that all such modifications and improvements have been deleted herein for the sake of conciseness and readability, but are properly within the scope of the following claims.

What is claimed is:

1. An intelligent nozzle for a fuel dispenser comprising:

a. a body having
   i. a fuel inlet for receiving fuel,
   ii. a spout for delivering fuel,
   iii. a flow path between said inlet and said spout, and
   iv. a handle portion with a trigger for controlling the fuel delivery along said flow path;

b. a control system for processing information at said nozzle; and c. wireless communication electronics operatively associated with said control system and adapted to provide bi-directional, connectionless, wireless, communications between said nozzle and a dispenser communication device;

said control system and communication electronics operating to provide an intrinsically safe wireless communication link between said nozzle and the dispenser communication device;

wherein the communication electronics is a transponder adapted to receive energy from the dispenser communication device and transmit a signal carrying information to the dispenser communication device, wherein said transponder is adapted to use the energy received from the dispenser communications device to facilitate transmission.

2. The intelligent nozzle of claim 1 wherein said nozzle includes a power supply coupled to said control system.

3. The intelligent nozzle of claim 2 wherein said power supply includes a battery.

4. The intelligent nozzle of claim 3 wherein said battery is rechargeable and said power supply includes a recharging circuit adapted to receive coupled energy to recharge said battery.

5. The intelligent nozzle of claim 4 wherein said power supply is adapted to receive electromagnetically coupled energy.

6. The intelligent nozzle of claim 1 further comprising a display mounted to said body and coupled to said control system to display information output from said control system.

7. The intelligent nozzle of claim 1 further comprising an input device mounted to said body and coupled to said control system to input information to said control system.

8. The intelligent nozzle of claim 1 further comprising a card reader mounted to said body and coupled said control system to input information to said control system.

9. The intelligent nozzle of claim 1 wherein said trigger is operatively coupled to trigger a position detector adapted to provide a trigger position signal indicative of trigger position, said control system adapted to receive the trigger position signal and provide a flow control signal based thereon.

10. The intelligent nozzle of claim 9 further comprising a flow control valve in said flow path, said flow control valve responsive to said flow control signal to control flow in said flow path based on trigger position.

11. The intelligent nozzle of claim 9 wherein said flow control signal is transmitted to a fuel dispenser to control fuel flow to said inlet.

12. The intelligent nozzle of claim 1 wherein said control system operates to transmit information obtained at said nozzle to the dispenser communication device via said communication electronics.

13. The intelligent nozzle of claim 12 further comprising a flow meter in said flow path providing flow information to said control system for transmission to the dispenser communication device via said communication electronics.

14. The intelligent nozzle of claim 12 further comprising an input device providing customer entered information to said control system for transmission to the dispenser communication device via said communication electronics.

15. The intelligent nozzle of claim 12 further comprising a trigger position detector providing trigger position information to said control system for transmission to the dispenser communication device via said communication electronics.

16. The intelligent nozzle of claim 12 further comprising an octane sensor in said flow path providing an octane rating information to said control system for transmission to the dispenser communication device via said communication electronics.

17. The intelligent nozzle of claim 12 further comprising a vapor recovery path between said spout and said inlet and a hydrocarbon sensor in said flow path providing a hydrocarbon concentration information to said control system for transmission to the dispenser communication device via said communication electronics.

18. The intelligent nozzle of claim 12 further comprising a sensor providing information to said control system for transmission to the dispenser communication device via said communication electronics.

19. The intelligent nozzle of claim 1 wherein said control system operates to receive information via said communication electronics from the dispenser communication device.

20. The intelligent nozzle of claim 19 further comprising a display mounted on said body and coupled to said control system, said control system adapted to provide information received from the dispenser communication device via said communication electronics to said display.

21. The intelligent nozzle of claim 19 further comprising a flow control valve in said flow path and coupled to said control system, said control system adapted to control said flow control valve based on information received from the dispenser communication device via said communication electronics.

22. The intelligent nozzle of claim 1 wherein said control system operates to transmit information obtained at said nozzle to the dispenser communication device and receive information from the fuel dispenser via said communication electronics.

23. The intelligent nozzle of claim 1 wherein said communication electronics include a receiver with in said flow path to receive a signal transmitted within a delivery hose communicating with said inlet.

24. The intelligent nozzle of claim 1 wherein said communication electronics communicate at radio frequencies.

25. The intelligent nozzle of claim 1 wherein said transponder receives the information for transmission from said control system.

26. The intelligent nozzle of claim 1 wherein said communication electronics and said control system are integrated.

27. A fuel dispenser for communicating with a remote intelligent nozzle at an end of a delivery hose comprising:

a. a housing;

b. a fuel delivery system at said housing having a fuel supply line, a metering device, and a delivery hose connected to an intelligent nozzle to permit the dispensing of fuel;

c. a communication electronics; and d. a control system in said housing adapted to bi-directionally, connectionlessly and wirelessly communicate with the intelligent nozzle through said communication electronics;

wherein the intelligent nozzle contains a transponder adapted to receive energy from the communication electronics and transmit a signal carrying information to the communication electronics, wherein the transponder is adapted to use the energy received from the communication electronics to facilitate transmission.

28. The fuel dispenser of claim 27 wherein said control system generates transaction information and transmits said transaction information to the nozzle via said communication electronics.

29. The fuel dispenser of claim 27 wherein said control system receives information from said metering device and transmits flow related information to the nozzle via said communication electronics.

30. The fuel dispenser of claim 27 wherein said control system is adapted to generate nozzle control information and transmit said nozzle control information to the nozzle via said communication electronics.

31. The fuel dispenser of claim 27 wherein said control system is adapted to receive flow control information from the nozzle via said communication electronics and control said fuel delivery system accordingly.

32. The fuel dispenser of claim 31 wherein said fuel delivery system includes means for controlling the flow rate and the flow control information relates to a trigger position at the nozzle.

33. The fuel dispenser of claim 27 wherein said control system is adapted to receive customer input information from the nozzle via said communication electronics and control said dispenser accordingly, wherein the customer input information is entered at an input device at the nozzle.

34. The fuel dispenser of claim 27 wherein said control system is adapted to receive a sensor signal via said communication electronics and control said dispenser accordingly.

35. The fuel dispenser of claim 34 wherein said sensor signal is indicative of an octane rating.

36. The fuel dispenser of claim 34 further comprising a vapor recovery system associated with said control system wherein said sensor signal is indicative of a hydrocarbon concentration in a vapor return line in the nozzle and said control system is adapted to control said vapor recovery system according to the sensor signal.

37. The fuel dispenser of claim 27 wherein said control system is adapted to receive information via said communication electronics wherein said information was received by the nozzle from a remote communication unit and transmitted by the nozzle to the communication electronics.

38. The fuel dispenser of claim 27 wherein said control system is adapted to transmit information via said communication electronics wherein said information will be transmitted to the nozzle by the communication electronics, received by the nozzle and transmitted by the nozzle to a remote communication unit.

39. A fuel dispenser for communicating with a remote intelligent nozzle at an end of a delivery hose comprising:

a. a fuel dispenser having:
 i. a housing;
 ii. a fuel delivery system at said housing having a fuel supply line, a metering device and an outlet;
 iii. dispenser communication electronics; and
 iv. a dispenser control system in said housing;

b. an intelligent nozzle having:
 i. a body having:
  a) a fuel inlet for receiving fuel,
  b) a spout for delivering fuel,
  c) a flow path between said inlet and said spout, and
  d) a handle portion with a trigger for controlling the fuel delivery along said flow path;
 ii. a control system for processing information at said nozzle;
 iii. wireless, nozzle communication electronics operatively associated with said control system and adapted to provide bidirectional, connectionless, wireless communications between said nozzle and said dispenser communication electronics; and
 iv. said control system and communication electronics operating to provide an intrinsically safe wireless communication link between said nozzle communication electronics and the dispenser communication electronics; and c. a delivery hose connecting said inlet of said nozzle and said outlet of said dispenser to permit the dispensing of fuel;

wherein the communication electronics is a transponder adapted to receive energy from the dispenser communication electronics and transmit a signal carrying information to said dispenser communication electronics, wherein the transponder is adapted to use the energy received from said dispenser communication electronics to facilitate transmission.

40. A method of using an intelligent nozzle with a fuel dispenser comprising:

a. providing a nozzle having first communication electronics;

b. providing a fuel dispenser having second communication electronics adapted to communicate with the first electronics;

c. wirelessly and connectionlessly transmitting information bi-directionally between the nozzle and fuel dispenser; and d. controlling the nozzle based on the information;

wherein the first communication electronics is a transponder adapted to receive energy from the second communication electronics and transmit a signal carrying information to the second communication electronics, wherein said transponder is adapted to use the energy received from the second communication electronics to facilitate transmission.

41. The method of claim 40 further comprising displaying the information on a nozzle display.

42. A method of using an intelligent nozzle with a fuel dispenser comprising:

a. providing a nozzle having first communication electronics;

b. providing a fuel dispenser having second communication electronics adapted to communicate with the first electronics;

c. wirelessly and connectionlessly transmitting information bi-directionally between the nozzle and fuel dispenser; and d. controlling the dispenser based on the information;

wherein the first communication electronics is a transponder adapted to receive energy from the second communication electronics and transmit a signal carrying information to the second communication electronics, wherein the transponder is adapted to use the energy received from the second communication electronics to facilitate transmission.

43. The method of claim 42 further comprising receiving the information from a customer at the nozzle.

44. The method of claim 42 further comprising generating the information based on conditions at the nozzle.

45. A method of using an intelligent nozzle with a fuel dispenser comprising:

a. providing a nozzle having first communication electronics;

b. providing a fuel dispenser having second communication electronics adapted to communicate with the first electronics;

c. transmitting information bi-directionally and connectionlessly between the nozzle and fuel dispenser;

d. controlling the nozzle based on the information;

e. transmitting information from the nozzle to the fuel dispenser; and f. controlling the dispenser based on the information;

wherein the first communication electronics is a transponder adapted to receive energy from the second communication electronics and transmit a signal carrying information to the second communication electronics, wherein the transponder is adapted to use the energy received from the second communication electronics to facilitate transmission.

* * * * *